(12) United States Patent
Friederichs et al.

(10) Patent No.: US 12,031,697 B2
(45) Date of Patent: Jul. 9, 2024

(54) STREET POLE, STREET LIGHTING POLE, LUMINAIRE AND MANUFACTURING METHODS THEREOF

(71) Applicant: SIGNIFY HOLDING B.V., Eindhoven (NL)

(72) Inventors: Winand Hendrik Anna Maria Friederichs, Elsloo (NL); Ay Ling De Goederen-Oei, Best (NL); Alouisius Johannes Gerardus Maria Willemse, Erp (NL); Kwan Nai Lee, Veldhoven (NL); Nicolaas Antonie Van Rijswijk, Oss (NL); Frank Walterus Franciscus Marie Van Kempen, Echt (NL); Walter Johannes Marie Goerts, Heesch (NL); Derk Tiekink, Mierlo (NL); Robert Jacob Pet, Eindhoven (NL); Georges Marie Calon, Waalre (NL)

(73) Assignee: SIGNIFY HOLDING B.V., Eindhoven (NL)

(*) Notice: Subject to any disclaimer, the term of this patent is extended or adjusted under 35 U.S.C. 154(b) by 424 days.

(21) Appl. No.: 17/292,828

(22) PCT Filed: Nov. 18, 2019

(86) PCT No.: PCT/EP2019/081616
§ 371 (c)(1),
(2) Date: May 11, 2021

(87) PCT Pub. No.: WO2020/109048
PCT Pub. Date: Jun. 4, 2020

(65) Prior Publication Data
US 2021/0396365 A1    Dec. 23, 2021

(30) Foreign Application Priority Data

Nov. 29, 2018  (EP) .................................... 18209045
Feb. 22, 2019  (EP) .................................... 19158754

(51) Int. Cl.
  *H01Q 1/12*      (2006.01)
  *F21S 8/08*      (2006.01)
(52) U.S. Cl.
  CPC .......... *F21S 8/088* (2013.01); *H01Q 1/1207* (2013.01); *H01Q 1/1242* (2013.01)
(58) Field of Classification Search
  CPC ..... H01Q 1/1207; H01Q 1/1242; H01Q 1/246
  See application file for complete search history.

(56) References Cited

U.S. PATENT DOCUMENTS 5,291,211 A   3/1994   Tropper
5,641,141 A   6/1997   Goodwin
(Continued)

FOREIGN PATENT DOCUMENTS

CN   202888735 U   4/2013
CN   203897663 U   10/2014
(Continued)

*Primary Examiner* — Hoang V Nguyen

(57) ABSTRACT

A street pole comprising an antenna section with a coaxially mounted antenna around a pole. The antenna section having a length L and comprising at least one of the following features: —suspension with O-rings wherein the O-rings are each mounted at a distance Dr of $0.5*(1-\tfrac{1}{2}\sqrt{2})*L$ from a respective end of the antenna; —a fix suspension at bottom; —a reduced outer diameter of the pole at at least one end (i.e. top end and/or bottom end) of the antenna; and—one of i) an extruded cable sleeve with opening in circumference over its full length for easy assembling and to spring mount the cable sleeve around the pole, and ii) a grooved pole with specifically shaped grooves for collecting residual particles at preferred locations.

11 Claims, 11 Drawing Sheets

(56) References Cited

U.S. PATENT DOCUMENTS

| | | | |
|---|---|---|---|
| 2007/0180662 A1* | 8/2007 | Heath | F16L 3/137 24/25 |
| 2011/0156984 A1 | 6/2011 | Caldwell et al. | |
| 2013/0082900 A1 | 4/2013 | Rodriguez et al. | |
| 2015/0013261 A1 | 1/2015 | Kolokotronis | |
| 2018/0219278 A1 | 8/2018 | Wigdahl et al. | |

FOREIGN PATENT DOCUMENTS

| | | | |
|---|---|---|---|
| CN | 206829752 U | 1/2018 | |
| CN | 208062236 U | 11/2018 | |
| DE | 102005063234 A1 | 6/2007 | |
| EP | 1341255 A1 * | 9/2003 | H01Q 1/1242 |
| EP | 2796774 A1 | 10/2014 | |
| JP | H0653894 A | 2/1994 | |
| JP | H06162814 A | 6/1994 | |
| JP | 2000151234 A | 5/2000 | |
| JP | 2004173367 A | 6/2004 | |
| JP | 2013531423 A | 8/2013 | |
| WO | 0076022 A1 | 12/2000 | |
| WO | 2018114495 A1 | 6/2018 | |
| WO | 2018114510 A1 | 6/2018 | |
| WO | 2019007444 A2 | 1/2019 | |

\* cited by examiner

STREET POLE, STREET LIGHTING POLE, LUMINAIRE AND MANUFACTURING METHODS THEREOF

CROSS-REFERENCE TO PRIOR APPLICATIONS

This application is the U.S. National Phase application under 35 U.S.C. § 371 of International Application No. PCT/EP2019/081616, filed on Nov. 18, 2019, which claims the benefit of European Patent Applications Nos. 19158754.2, filed on Feb. 22, 2019 and EP18209045.6, filed on Nov. 29, 2018. These applications are hereby incorporated by reference herein.

FIELD OF THE INVENTION

The invention relates to a mast or street pole comprising an antenna section, a mast or street lighting pole with integrated antenna, a luminaire and methods of manufacturing these.

BACKGROUND OF THE INVENTION

More particularly, the invention relates to street lighting poles that have been modified to include telecom equipment (radios, antennas, cables) such that the street lighting pole also gets a wireless telecommunications functionality. Even more specifically the field of the invention is about street lighting poles in which the equipment is integrated within the outer surface of the light pole with the purpose of obscuring it from public view. This is referred to as telecom smart pole.
The current state of the art the telecom smart poles includes a range of poles of different height. These poles are available in different colors and can be mounted with different luminaires, with the aim to offer a smart pole family that can be located at different locations in public space and hence has the broadest market acceptance.

As the smart street poles are arranged outdoors they have to be treated, i.e. provided with a protective coating, to enable them to better withstand the outdoor, ambient atmospheric conditions. This requires a coating process, which typically causes blocking of grooves in which cables are to be accommodated. Furthermore, the smart pole street luminaires are provided with an 4G/5G radio antenna snugly fitted as a mantle around the pole. In between the antenna and the pole a guiding cable sleeve is provided. When a load, e.g. lifting or wind, causes the street pole to bend, which involves the problem an enhanced risk on prematurely failure of the antenna system.

SUMMARY OF THE INVENTION

It is an object of the invention to counteract the above-mentioned problem. Thereto, a street pole is provided as claimed in claim 1. In particular, to create a desired clearance or bending space between the tubular antenna having a length L and a street pole over which it is mounted, at least one of the following mounting tolerance means are proposed as antenna mounting tolerance features:
1. ½√2 suspension with O-rings wherein the O-rings are each mounted at a distance Dr of $0.5*(1-\frac{1}{2}\sqrt{2})*L \pm 10\%$ from a respective end of the antenna;
2. Fixed suspension at bottom and flexible 'suspension' at top;
3. Creating bending space by reduced outer diameter in the pole at top end and/or bottom end of the antenna;
4. An extruded cable sleeve with opening in circumference over its full length for easy assembling and to spring mount the cable sleeve around the pole, also providing more clearance;
5. Integrally improved concept combining solutions 1-4.

In dependence of the chosen configuration for obtaining the clearance, a specific clearance range is preferred, i.e.:
a clearance range from 0.2 mm up to 8 mm can be applied for all solutions, for example when the extruded cable sleeve is integrated in the pole;
a clearance range from 2 mm up to 5.5 mm can be applied for a limited set of solutions, for example when the sleeve is extruded with an axially extending opening in the circumference over the full length of the sleeve;
a clearance range from 3 mm up to 4.5 mm is preferably applied when the O-rings are used for the mounting of the antenna.

These solutions will be discussed in more detail in the section of detailed description of preferred embodiments. However, it is noted that each solution is generally and individually or in any combination applicable for various types of embodiments of street poles, i.e. not necessarily in combination with all other features of the embodiments shown. Furthermore, the street lighting pole can also be a simple pole without lighting function, i.e. just being a simple street pole.

In this concept a number of modular components can be discriminated that can be listed and explained below.
The base: This module is used to locate the telecommunication equipment that generates and receives the radio frequent radio signals. Also ancillary equipment like circuit-breakers, power distribution and fiber management can be located in the base;
The mid-pole: This is a steel transition piece that can be ordered at different lengths in order to achieve a range of pole heights;
The antenna section: The antenna section is a structural element of the pole and can carry the mechanical load of the parts that are mounted above, e.g. luminaires, spigots, arms, considering the direction of gravity;
(not visible) Antenna cabling: These run through the mid-pole to connect the radios with the antennas, they will have different lengths for different mid-pole sizes;
The luminaire with optional mounting arm: The pole can be combined with pole-top luminaires and side-mounts.
The current invention(s) overcomes problems that occur in the antenna section.

However, before mounting of an antenna around the pole, the pole first has to be prepared for long service life, i.e. it should be made better resistant to against the corroding atmospheric circumstances to which it is exposed during lifetime. The manufacture of the invention concept, however, comes with its own manufacturability problems. For strength and stiffness, the antenna pole is made from a high grade steel which in turn needs to be protective coated (e.g. galvanized or dip-coated) to protect it against corrosion for the intended outdoor applications environment. This coating process is not without its own problems. Hence, the first part of this invention relates to overcome the drawbacks of the coating process of the antenna pole with machined grooves in its outer periphery. A relatively very cost efficient coating process for a pole of this size is hot-dipping, for example in a liquid bath of hot Chromium or much cheaper Zn—Fe alloy. This deposit is a thick layer of Chrome or Zinc-Iron alloy on the surface of the steel. This is not a particularly well controlled process compared to electro-galvanization used in automobile industry, where the surface finish of the base material (plate steel) is finer and a thin layer is desired for further processing with paint.

In case of hot-dipping an antenna pole (especially a part of this size) residual particles will stay inside the grooves of the improved antenna pole affecting the fit of the cabling in the grooves, not only in cross-section but also over the length. Increasing the depth and width of the grooves and reducing the outer diameter of the antenna pole to account for the 'residuals' is not desired as it counters the intention of the first part of the invention to increase stiffness of the antenna pole. The main invention to overcome the coating residuals issue, is to create pockets and/or smaller axial grooves in the bottom of the axial main grooves. Any residuals due to the hot dipping coating process will now flow into these deeper laying pockets and/or grooves and which limits the impact on the final dimensions of the main grooves.

Embodiments of the invention include machining, extruding, V-grooving of pockets and/or grooves in the antenna tube are provided, each with their practical manufacturing options.

The concept of the present invention, also referred to as Smart Fusion Pole concept, is unique in the way how the antennas are integrated in the total system. The antennas are arranged around a hollow cylinder which is slid over a support spindle (the antenna pole) and, for example, suspended to the pole by O-rings wherein the O-rings are each mounted at a distance Dr of $0.5*(1-\frac{1}{2}\sqrt{2})*L$ from a respective end of the antenna. Said distance Dr is not limited to its exact value of $0.5*(1-\frac{1}{2}\sqrt{2})*L$, but comprises a small tolerance of + or −10% in said distance Dr. The advantage of this specific concept is that the antennas can function omni-directional without any mechanical part blocking part of the signal. The antenna cabling is run between the antennas (located on the outer periphery of the cylinder) and the antenna pole (support spindle in the form of a hollow tube). The disadvantage of this concept is in the event of antenna pole bending due to wind loading (on top of the smart fusion pole a luminaire must reside which catches wind) stresses are exerted on the delicate antenna equipment.

Hence, the second part of the invention aims to overcome excessive bending within the dimensional constraints of the overall slim concept of the Smart Fusion Pole. In order to improve the stiffness and resistance to bending a stiffer tube can be chosen for the street pole (or at least the antenna section), a larger outer diameter and a larger wall thickness. As mentioned above the cabling is run between the inside of the cylindrical antenna and over the outer surface of the antenna pole. Increasing the outer diameter of the antenna pole is constrained by the space that needs the be left for the cabling. To maximize the outer diameter of the antenna pole and leave maximum amount of material in the wall thickness, grooves are introduced in the outer surface of the antenna pole to accommodate the cables.

Various shapes of grooves are provided, each having its respective way and advantage in handling the Zn-residue problem. Yet, in general the groove design that leaves the most cross-sectional area (material) provides the best rigidity of the pole. Further, it is not necessary that each cable has its own groove, alternatively/additionally more cables be accommodated in a single groove, but symmetry issues with respect to correct operation of the antenna's is also an aspect to be considered, the higher the symmetry, for example evenly distribution of antenna cabling over the circumference of the pole, the better the pole should be able to resist bending in all directions as a default. When taking into account also the wind load due to the luminaire design it is possible to do some optimization there. Yet, also clustered groups of grooves, for example 4 clusters of 3 grooves, is also possible.

Typically, specific features of the invention can be described shortly as follows by the following examples:

Example 1

Street pole comprising an antenna section around which a coaxial antenna is to be mounted, the antenna section having a length L and comprising at least one of the following features:

$\frac{1}{2}\sqrt{2}$ suspension with O-rings wherein the O-rings are each mounted at a distance Dr of $0.5*(1-\frac{1}{2}\sqrt{2})*L\pm 10\%$ from a respective end of the antenna;

a fix suspension at bottom;

a reduced outer diameter of the pole at at least one end (i.e. top end and/or bottom end) of the antenna section; and one of:

an extruded cable sleeve with opening in circumference over its full length for easy assembling and to spring mount the cable sleeve around the pole, and a grooved pole with specifically shaped axial grooves for collecting residual particles at preferred locations.

Example 2

Street pole according to example 1, configured as a street lighting pole further comprising an antenna mounted around the antenna section, a luminaire section, a mid-pole section and a base section, wherein the sequence of mutually connected adjacent sections from base to top is: base section, mid-pole section, antenna section and luminaire section.

Example 3

Luminaire comprising s street pole according to example 2, further comprising electric cabling at least extending through a core opening in the antenna section and electronic equipment in the mid-pole and/or base section and configured for driving a light source 9 to be) accommodated in the luminaire section.

Example 4

Method of manufacturing an antenna pole section, comprising the steps of:

providing an antenna pole section with axial antenna cable guiding grooves in an outer surface of the antenna pole section over the full length of the antenna pole section, the grooves having at least one of the following features:

a sub groove at the bottom of the groove;

a rectangular cross section of the groove;

a V-shaped cross section of the groove;

a trapezoidal cross-section either widening or tapering inwards from the outer surface of the pole; and the depth of groove being 1.05 to 2 times, preferably at least 1.2 times to 1.5 times larger than the width of groove;

coating the antenna pole section with a corrosion resistant coating.

Example 5

Method of manufacturing an antenna pole section, comprising the steps of:
  coating the antenna pole section with a corrosion resistant coating,
  providing with clamping fit around the antenna pole section a cable sleeve comprising grooves.

Example 6

Method of manufacturing an antenna section, comprising the steps of:
  manufacturing an antenna pole section according to examples 4 or 5;
  mounting antenna cables in the grooves;
  providing antenna mounting tolerance means;
  mounting the antenna onto the antenna pole section.

BRIEF DESCRIPTION OF THE DRAWINGS

The invention will now be further elucidated by means of the schematic drawings, in which.

DETAILED DESCRIPTION OF PREFERRED EMBODIMENTS

Figure 1:
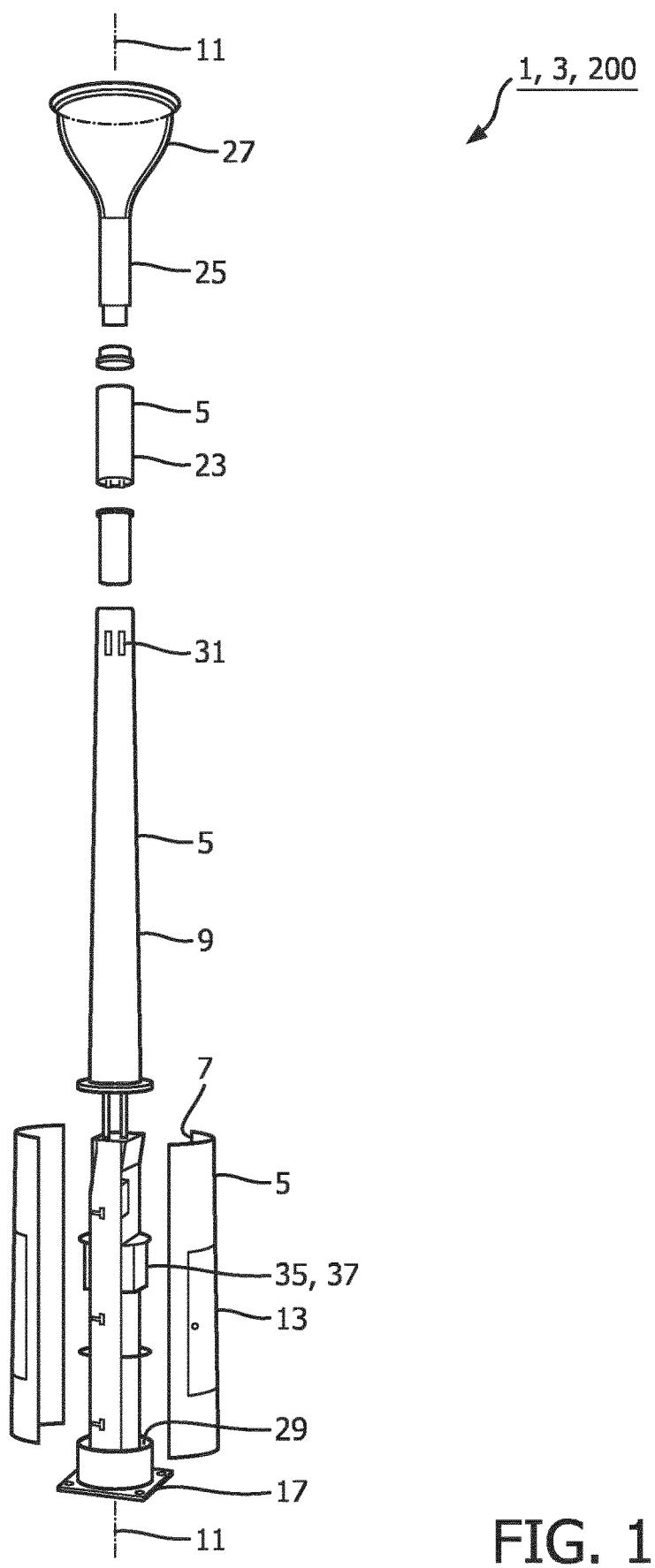
FIG. 1 shows a first embodiment of a street pole according to the invention.

FIG. 1 shows a first embodiment of a street pole as can be arranged outdoor, for example along a road. The street pole comprising:
  a base: This module is used to locate the telecommunication equipment that generates and receives the radio frequent radio signals. Also ancillary equipment like circuit-breakers, power distribution and fiber management can be located in the base;
  a mid-pole: This is a steel transition piece that can be ordered at different lengths in order to achieve a range of pole heights;
  an antenna section: The antenna section is a structural element of the pole and can carry the mechanical load of the parts that are mounted above (luminaires, spigots, arms);
  (not visible) Antenna cabling: These run through the mid-pole to connect the radios with the antennas, they will have different lengths for different mid-pole sizes
  a luminaire with optional mounting arm: The pole can be combined with pole-top luminaires and side-mounts.

In more detail FIG. 1 schematically depicts a partly exploded elongated structure 1 comprising a mast 3 having at least a wall 5 around a hollow core 7 as a tubular body or mid-pole section 9 extending along a length axis 11. A base mast segment/section 13 of the wall of the tubular body being connected to a first mast segment or antenna section 23 where the antenna is mounted. The antenna section on its turn is further releasably connected to a second mast segment or luminaire section 25. The tubular body in the figure is a round cylindrical shape, but alternatively could be a hexagonally shaped cylinder or an irregular octagonally shaped cylinder, or axially extending, not completely circumferential, for example semi-circular, parts thereof. The elongated structure is embodied as a modular street light pole 200, and further mounted on the second mast segment a lamp housing 27. A first vent opening 29 is present at a foot 17 of the street light pole and a second vent opening 31 is provided in the base mast segment 13 just below the first mast segment. In the base mast segment electric equipment 35, for example a radio 37 or lamp driver, is provided, for example to facilitate the functioning of an antenna provided in the first mast segment or to drive a lamp provided in the luminaire section.

Figure 2A:
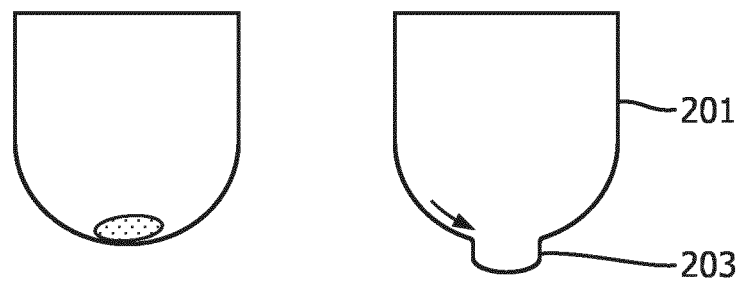
FIG. 2A-B show various groove shapes for counteracting drawbacks of the pole coating process.
Figure 2B:
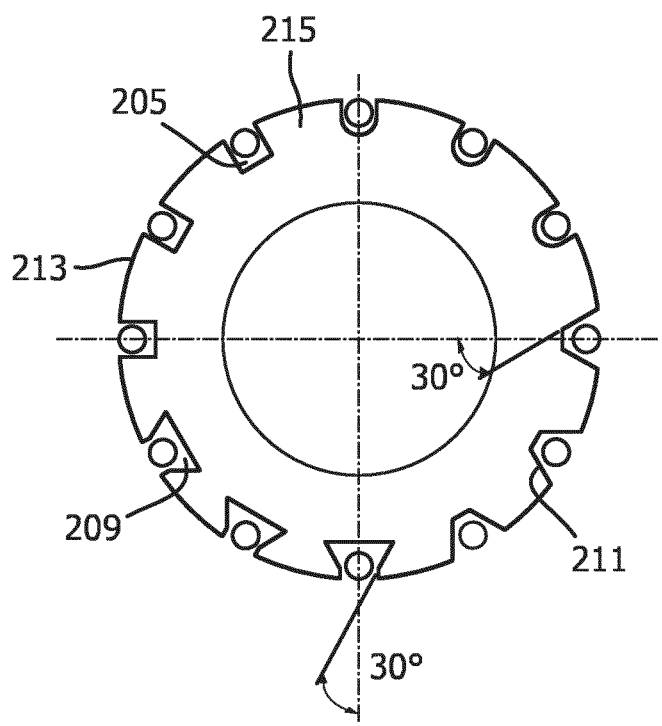

FIG. 2A-B shows solutions for overcoming the drawbacks of the Zn—Fe coating process of the antenna pole, i.e. the pole with specifically shaped machined axial grooves in its outer periphery next to the standard groove. Most cost efficient galvanization process for a pole of this size is hot-dipping. By this dipping a thick layer of zinc-iron alloys is deposited on the surface of the steel. This is not a particularly well controlled process compared to electro-galvanization used in automobile industry, where the surface finish of the base material (plate steel) is finer and a thin layer is desired for further processing with paint. In case of hot-dipping an antenna pole (especially a part of this size) residual particles of Zn-oxide and/or Zn—Fe oxide will stay inside the grooves of the improved antenna pole affecting the fit of the cabling in the grooves, not only in cross-section but also over the length. Increasing the depth and width of the grooves and reducing the outer diameter of the antenna pole to account for the 'residuals' is not desired as it counters the intention of the first part of the invention to increase stiffness of the antenna pole. A main feature of the invention to overcome the galvanization residuals issue is to create pockets and/or smaller grooves in the bottom of the main grooves. Any residuals due to the hot dipping galvanization process will now flow into these deeper laying pockets and/or grooves and which limits the impact on the final dimensions of the main grooves. See FIG. 2A. Other shaped grooves are also possible to counteract Zn residuals to accumulate in the grooves or to better confine the cable inside the groove and to maximize the outer surface of the pole, which is favorable for enhancing the bending strength (or rigidity) of the pole to reduce the (degree of) bending of the pole. The grooves 201 having at least one of the following features:
  a respective axial sub groove 203 at the bottom of each of the axial grooves;
  a rectangular cross section 205 of the groove;
  a V-shaped cross section of the groove;
  a trapezoidal cross-section with walls either widening 209 or tapering 211 inwards, for example each tapering wall 209, 211 at an angle of 30° with a radial direction as indicated, from the outer surface 213 of the pole 215; and
  the depth of groove being 1.05 to 2 times, preferably at least 1.2 times to 1.5 times larger than the width of groove.

Figure 3B:
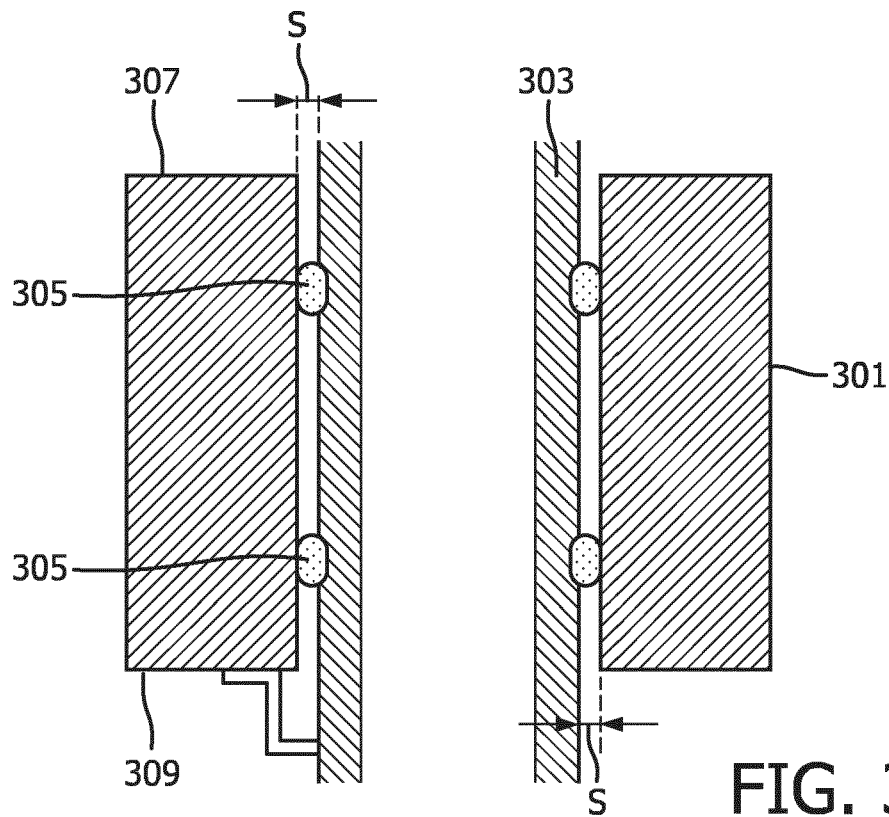
FIG. 3A-C shows the principle problem of antenna cracking due to bending of the pole.
Figure 3C:
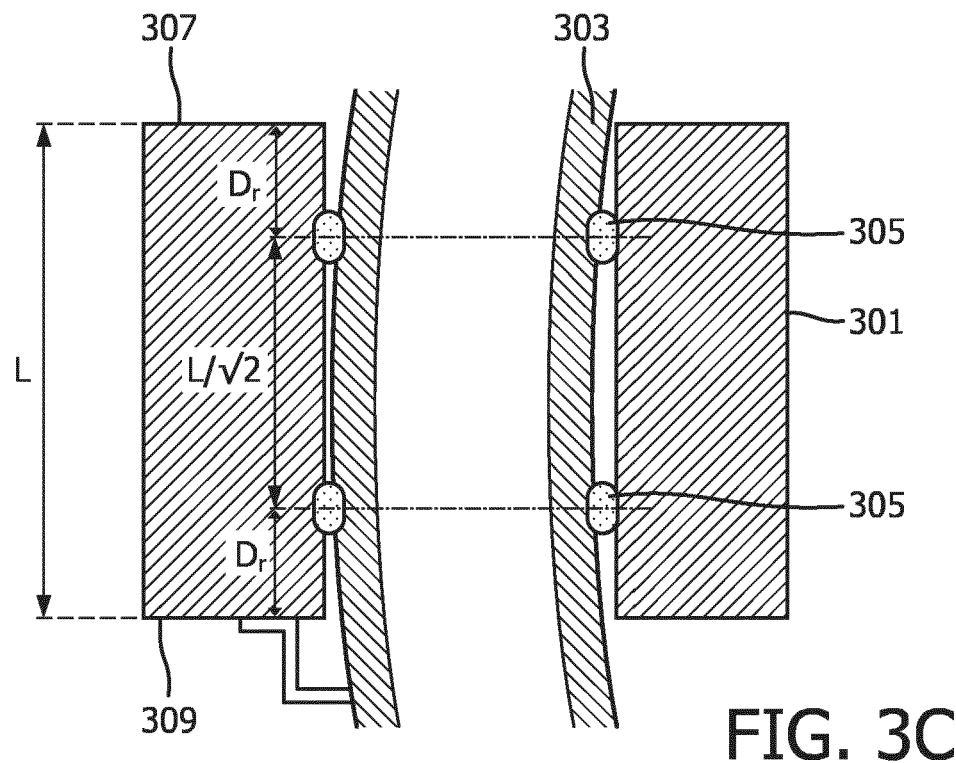
Figure 3A:
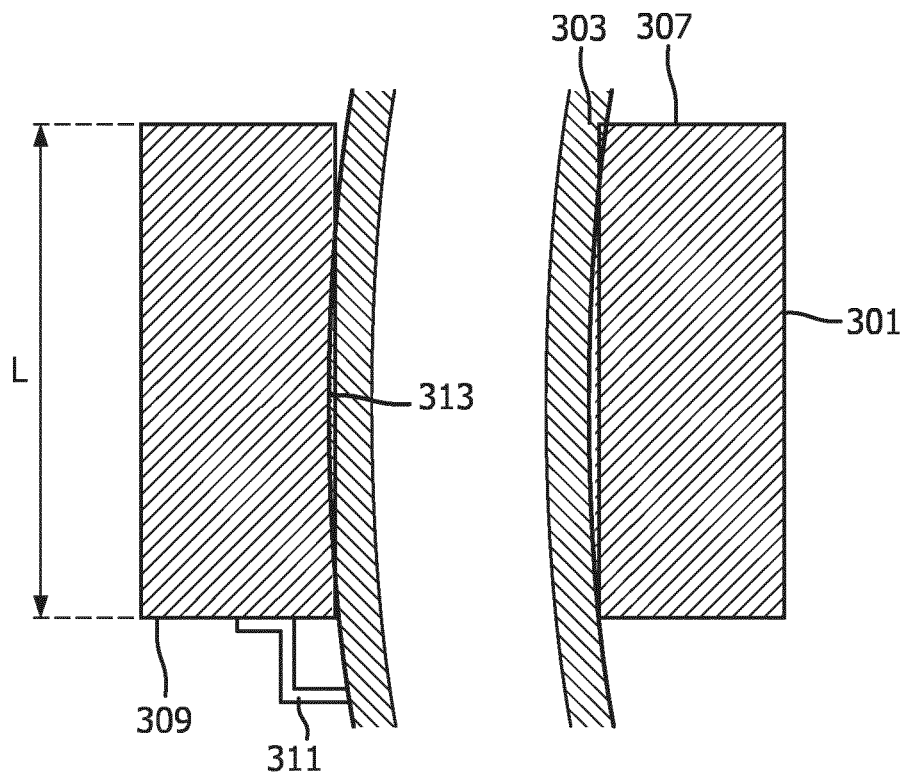

FIG. 3A shows the principle of the problem that occurs with an antenna 301 fixed to the pole 303 only at the bottom end 309 with fixing means 311 and mounted in a snugly fit with only a small tolerance or spacing around the pole 303. When a load, e.g. lifting or wind causes the pipe to bend thereby exceeding the fitting clearance, the antenna or antenna cables will crack causing failure of the antennae system because the pole is likely to exert a too large force on the antenna because of its bending touching the antenna in the middle 313 and/or at one of the ends 307, 309 of the antenna. In FIGS. 3B-C the problem is counteracted by suspending the antenna, having a length L, by clamp mounting on rubber O-rings 305 clamped around the pole 303 thus enabling the creation of a larger spacing S in combination with favorite bending points at the O-rings. The distance between the O-rings is $\frac{1}{2}\sqrt{2}*L$, the O-rings are each mounted at a distance $D_r$, preferably each $D_r$ is $0.5*(1-\frac{1}{2}\sqrt{2})*L$ from a respective end 307, 309 of the antenna. Yet, the respective Dr may be mutually different while the distance D between the O-rings remains $\frac{1}{2}\sqrt{2}*L$.

Figure 4B:
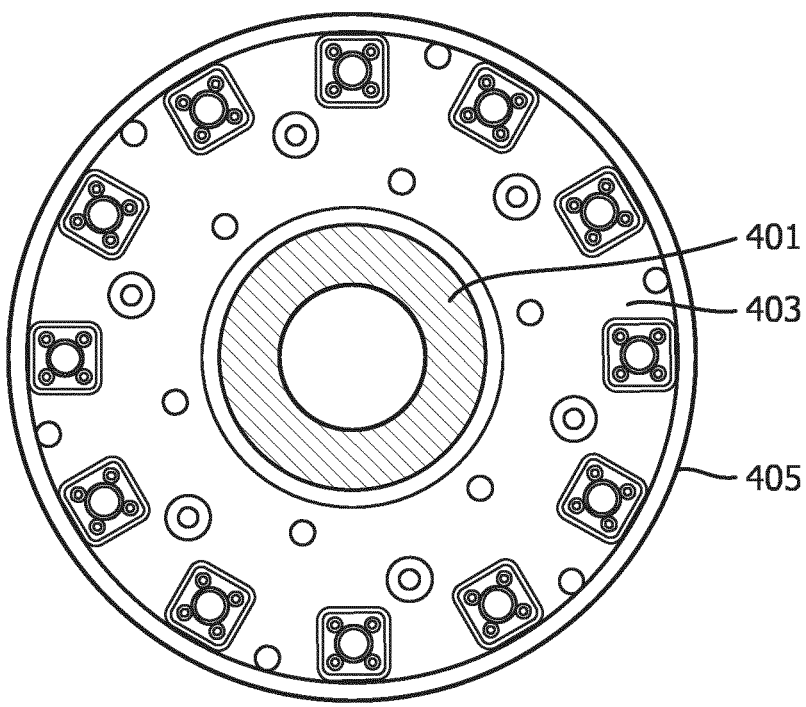
FIG. 4A-B show cross sections of an embodiment of the pole with mounted antenna.
Figure 4A:
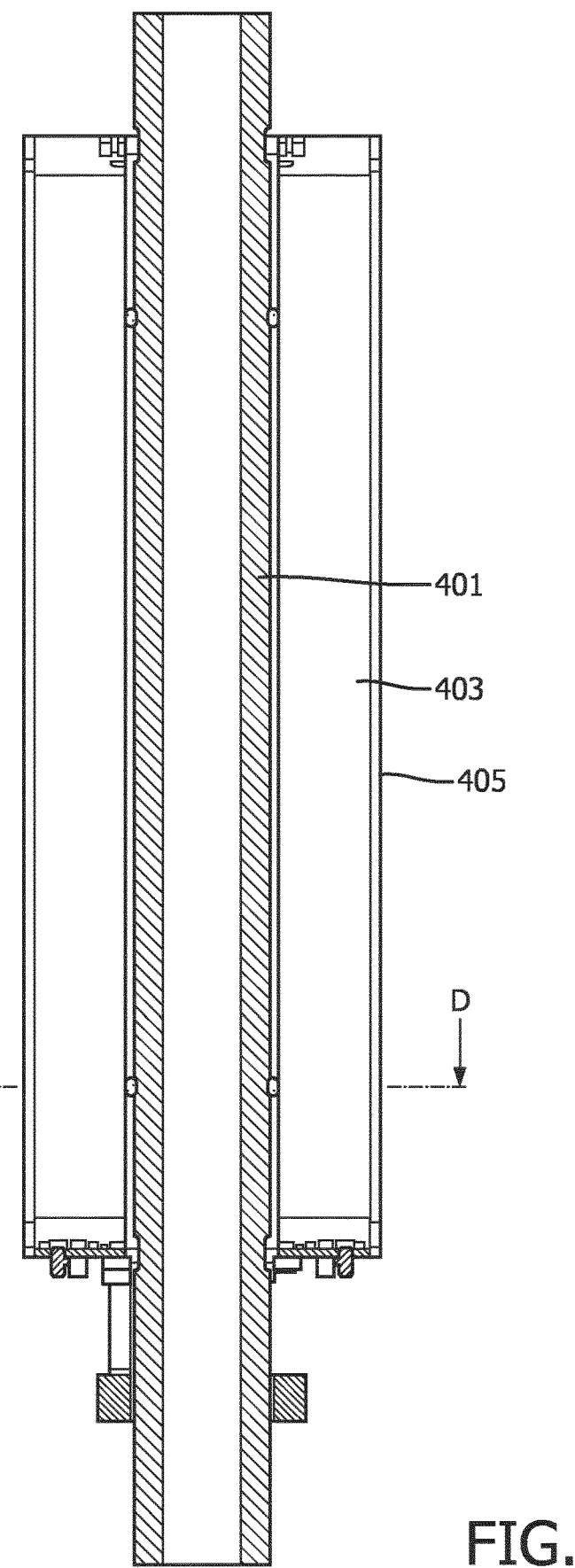

FIG. 4A-B shows a cross-sectional view, respectively in length direction, FIG. 4A, and in a direction transverse to the length direction along D—D, FIG. 4B, of a steel pipe as the pole 401 of the antenna section with the antenna 403 mounted around the pole. The antenna is shielded by an aesthetic screen 405 to render the antenna to be unobtrusively fitted onto the street pole luminaire.

Figure 5A:
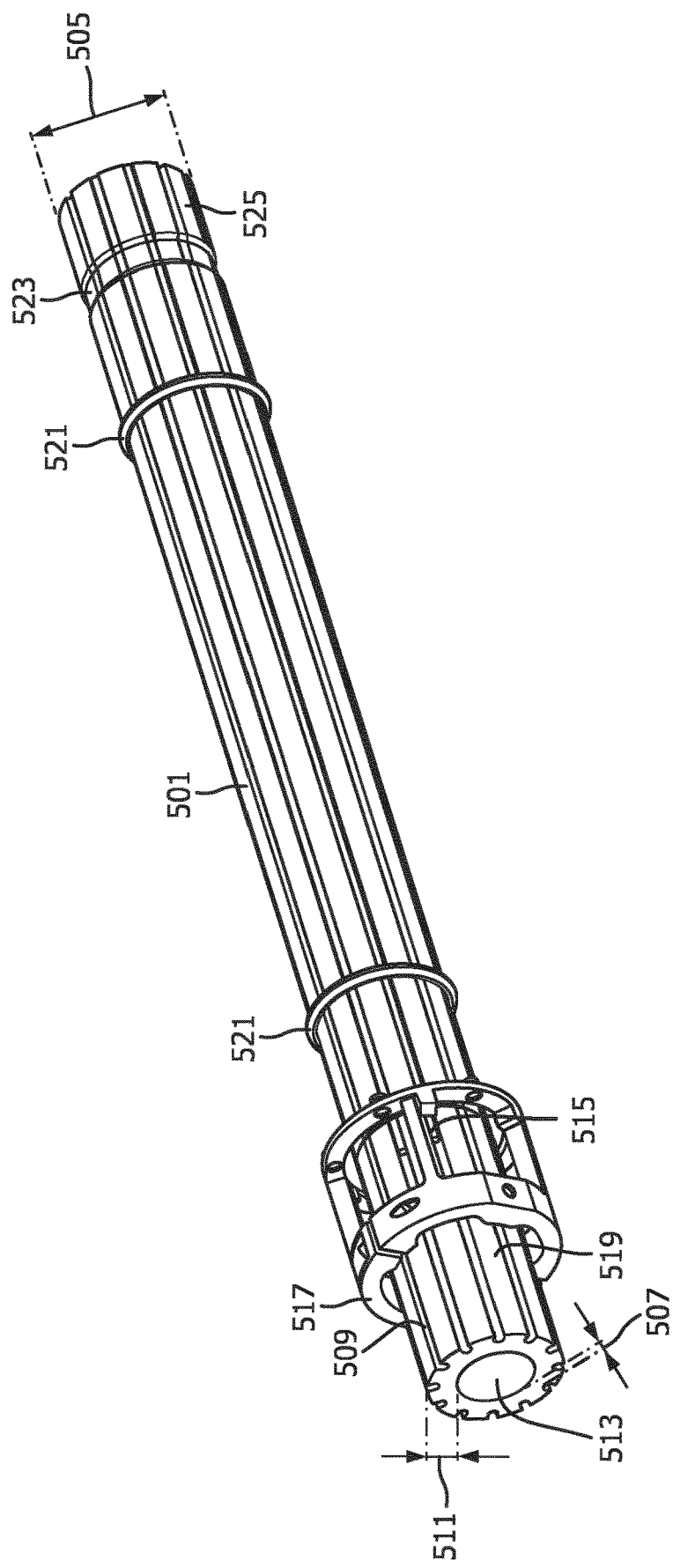
FIG. 5A-B shows perspective views of the pole respectively without and with mounted antenna.
Figure 5B:
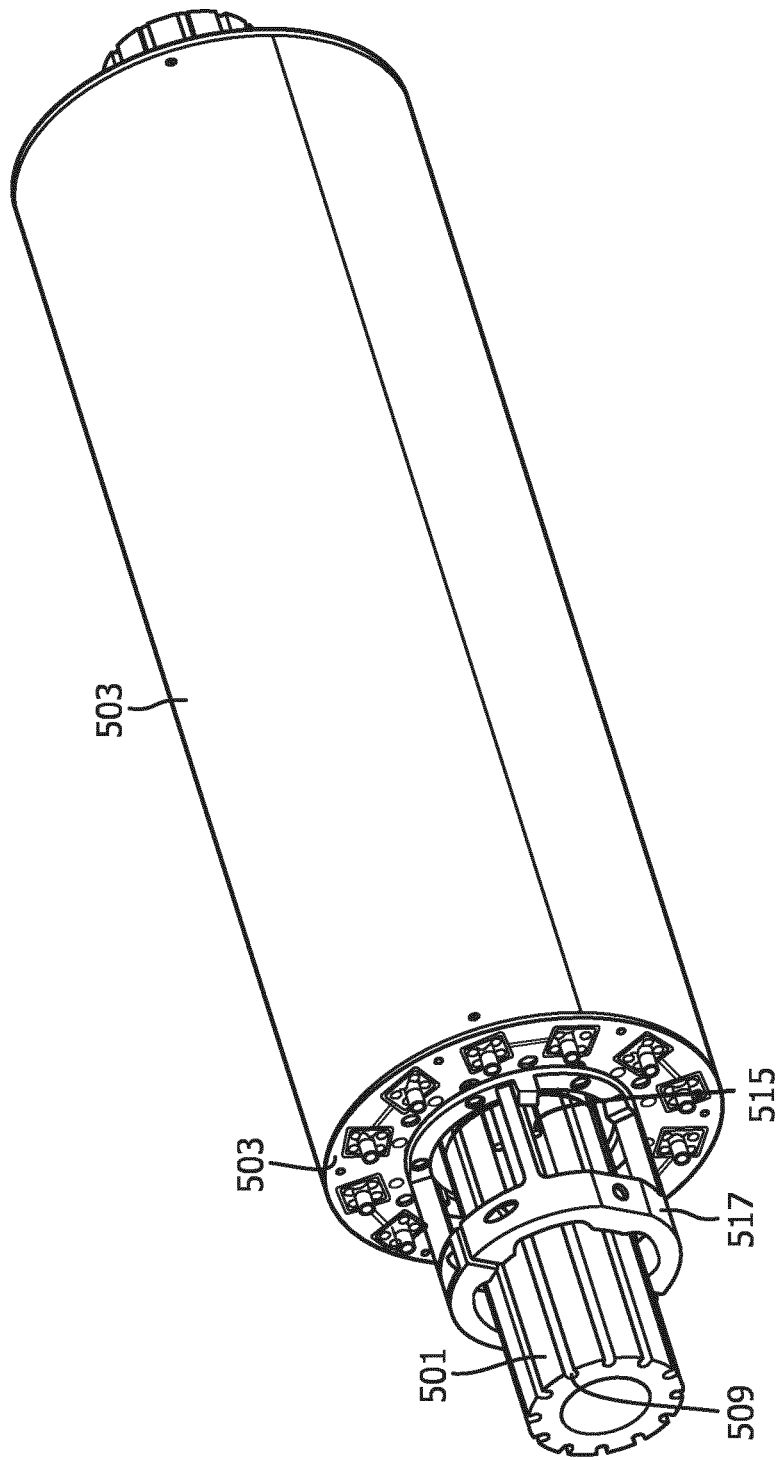

FIG. 5A-B shows a perspective view of a steel pipe as the pole 501 of the antenna section. In FIG. 5A without the antenna mounted around the pole, and in FIG. 5B with the antenna 503 mounted around the pole. The pole has an outer diameter 505 of 3.5", a minimum wall thickness 507 at grooves 509 of 11.8 mm or 0.46 inch, and a wall thickness 511 of 19.050 mm or ¾ of an inch. It further has a central hole 513 through which cabling extends (cabling not shown) for a light source accommodated in a luminaire housing mounted at the top of the street pole (not shown). The pole is provided with axial grooves accommodating antenna cabling 515. Further a fix suspension 517 is provided at a lower or bottom end part 519 of the pole (when the pole is arranged in upright position along or on the street) for supporting/carrying the antenna when mounted around the pole, rubber O-rings 521 are provided around the pole to provide spacing between pole and antenna to enable some bending of the pole and a bending space 523 is created by a reduced outer diameter in the pole at a top end 525 of the antenna.

Figure 6A:
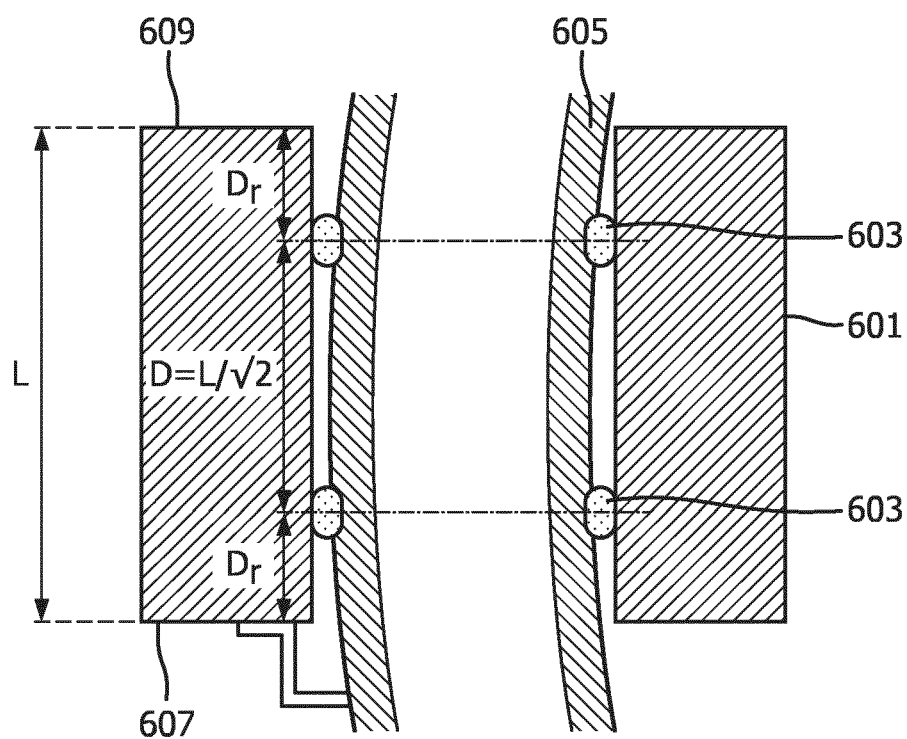
FIG. 6A-E shows various embodiments for counteracting the antenna cracking problem.

FIG. 6A shows a first solution of how the pole bending problem is counteracted. In FIG. 6A this attained by suspending the antenna 601, having a length L, by clamp mounting on rubber O-rings 603 clamped around the pole 605. The distance D between the O-rings is $\frac{1}{2}\sqrt{2}*L$, the O-rings are each mounted at a distance Dr of $0.5*(1-\frac{1}{2}\sqrt{2})*L$ from a respective bottom end 607 and top end 609 of the antenna.

Figure 6B:
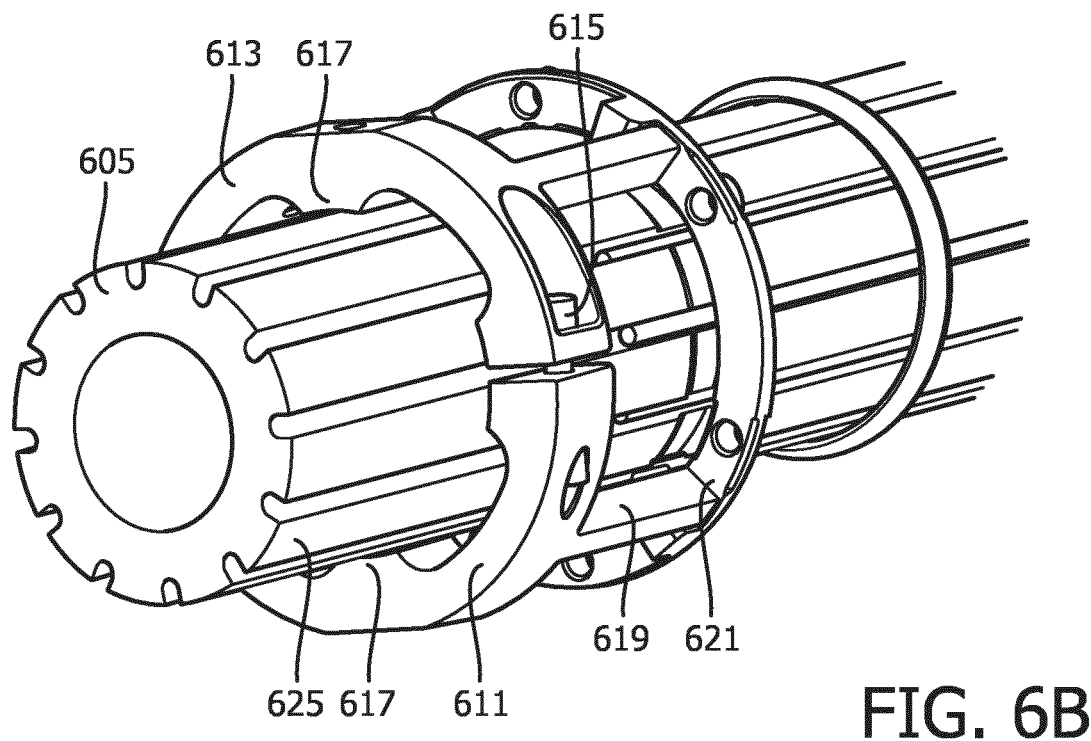

FIG. 6B shows a detailed view of fixation of the fix suspension 611 onto the pole 605, it has a first clamping, not fully closed, ring 613 with a threaded bolt construction 615 which bolt can be twisted to vary the size of the first ring and thus to clamp the suspension onto the pole with claws 617 that grip onto the outer surface 625 pole. Connected to and carried by the first ring via bridges 619 is a second ring 621 onto which the antenna (not shown) is mounted and supported.

Figure 6C:
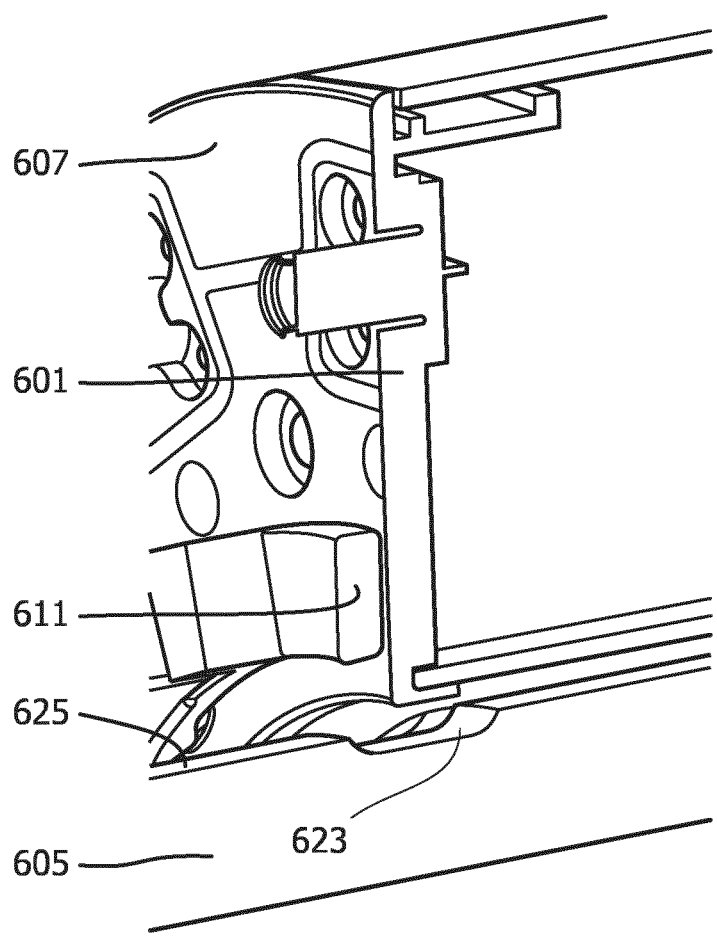

FIG. 6C shows a detailed view of the bending space as created by an indent 623 in the outer surface 625 of the pole 605 resulting in a reduction in outer diameter in the pole at the location of the bottom end 607 of the antenna 601, i.e. at a side where the antenna is supported by the fix suspension 611. Similarly, and additionally or alternatively such an indent in the outer surface of the pole can be provided at the location of the top end of the antenna 601.

Figure 6D:
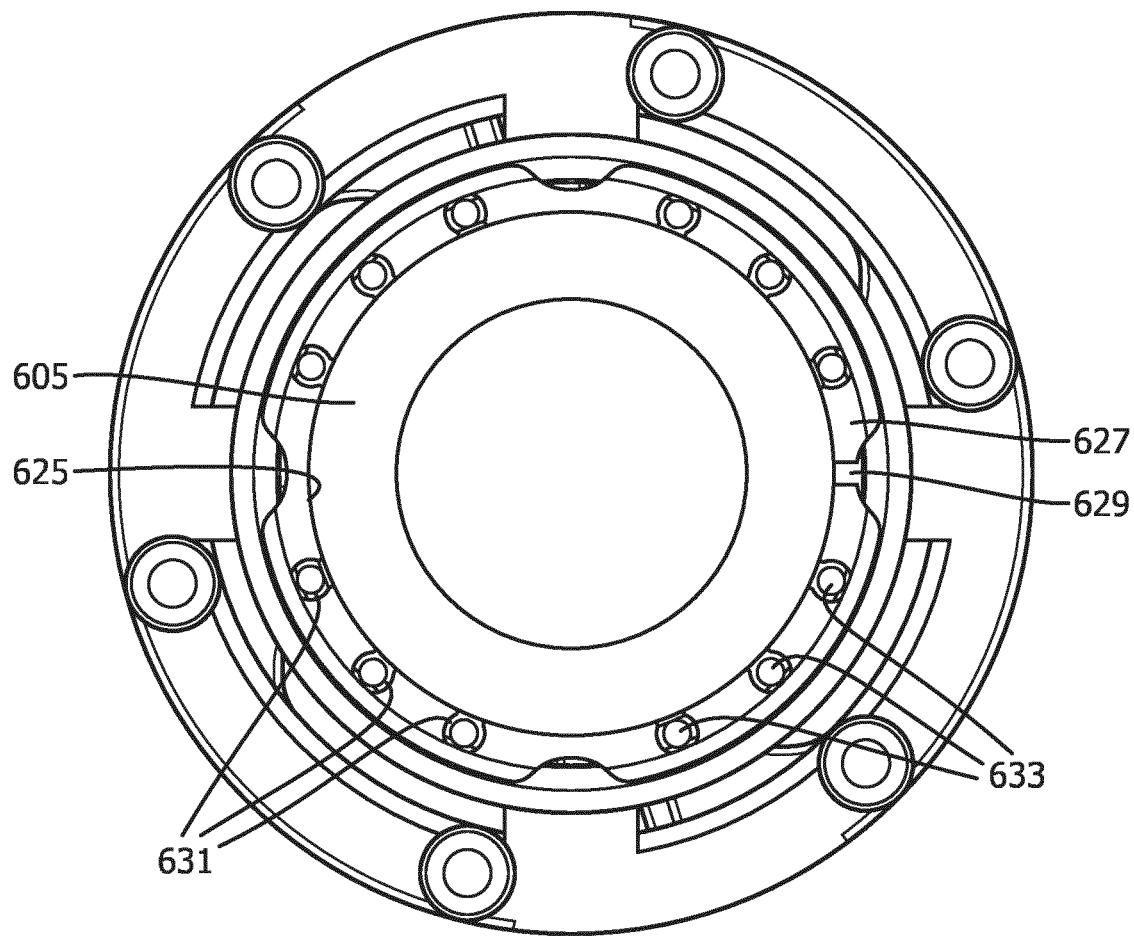

FIG. 6D shows a cross-sectional view of an extruded cable sleeve 627 with an axially extending opening 629 in circumference is shown for easy assembling and to spring mount the cable sleeve around and at the outer surface 625 of the pole 605, also providing more clearance between antenna and pole. Said spring mounted cable sleeve renders the antenna to have some flexibility, thus enabling to handle forces exerted by a bending pole. Note that in this case the pole itself is free from grooves, but that rather the separate sleeve 627 with grooves 631 for accommodating the antenna cabling 633 is provided around the pole.

Figure 6E:
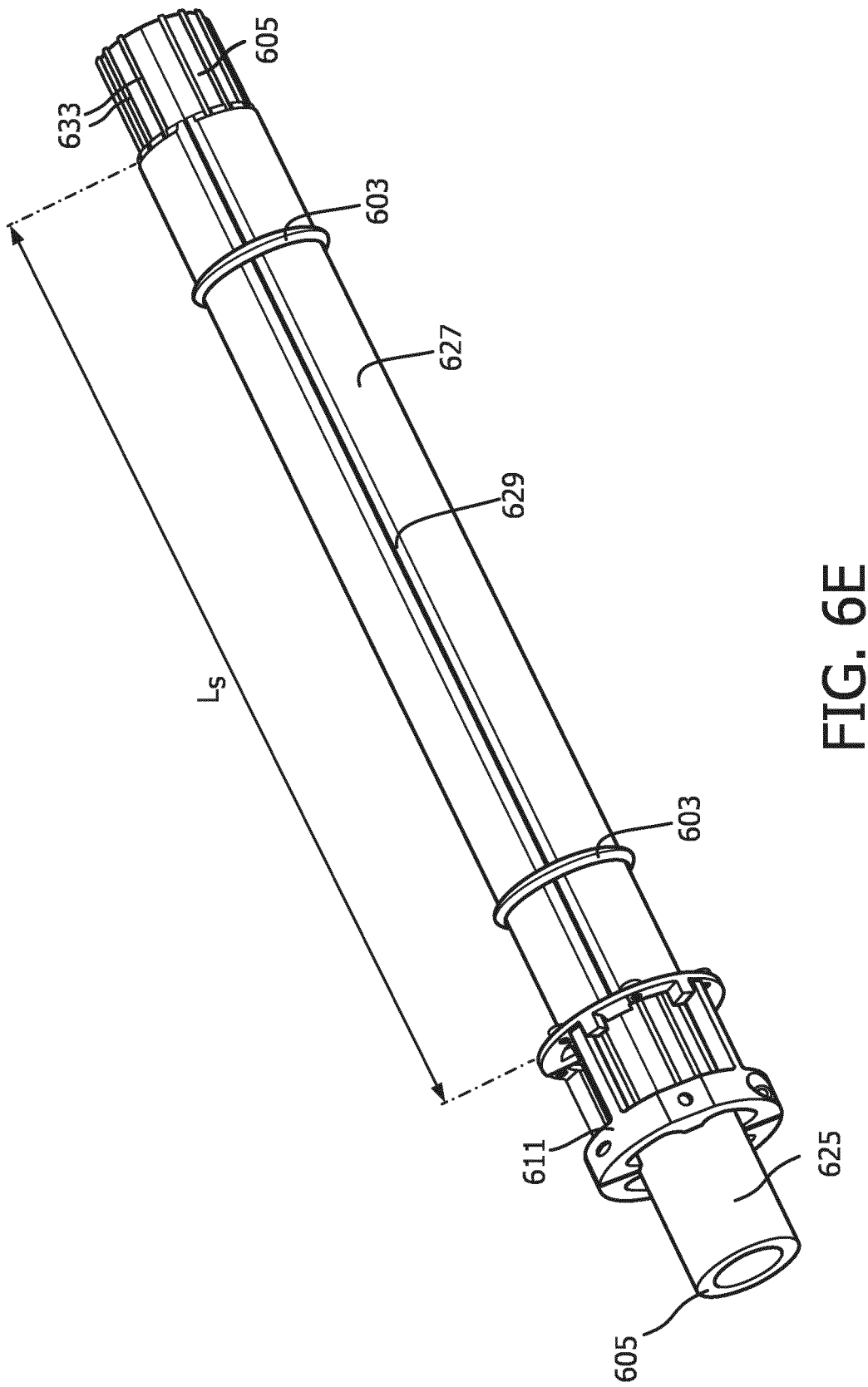

FIG. 6E shows a perspective view of an extruded cable sleeve 627 with the axially extending opening 629 in its circumference, said opening extending over the whole length Ls of the cable sleeve, which typically is the same as length L of the antenna (not shown), for easy assembling and to spring mount the cable sleeve around and at the outer surface 625 of the pole 605. Antenna cables 633 are accommodated in grooves (not shown) of the cable sleeve. For the mounting of the antenna around the pole with the desired tolerance/spacing between antenna and pole and antenna cable sleeve, the following features are provided:

Rubber, or alternatively silicone or ductile metal, O-rings 603 are provided around the sleeve, mutually at $\frac{1}{2}\sqrt{2}*L$ distance (L being the length of the antenna);

Fix suspension 611 at bottom and flexible 'suspension' at top of the antenna (not shown); and Creating bending space by reduced outer diameter in the pole at top end and/or bottom end of the antenna (not shown).

It should be noted that the above-mentioned embodiments illustrate rather than limit the invention, and that those skilled in the art will be able to design many alternative embodiments without departing from the gist of the invention. In the claims, any reference signs placed between parentheses shall not be construed as limiting the claim. Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to". The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A street pole comprising:
   an antenna section, said antenna section has a length L and comprises antenna mounting tolerance features to enable mounting of a coaxial antenna around the pole with at least a local clearance in a range of 0.2 to 8 mm for providing a bending space for the pole, wherein the antenna section comprises at least one of the following antenna mounting tolerance features for attaining the bending space:
  suspension with O-rings wherein the O-rings are each mounted at a distance Dr of $0.5*(1-\frac{1}{2}\sqrt{2})*L\pm10\%$ from a respective end of the antenna; or
  a reduced outer diameter of the pole at a bottom end and a top end of the antenna section; and
one of:
  an extruded cable sleeve with opening in circumference over its full length for easy assembling and to spring mount the cable sleeve around the pole, or
  a grooved pole with axial grooves for collecting residual particles at preferred locations.

2. The street pole as claimed in claim 1, wherein the axial grooves have at least one of the following features:
  an axial sub groove at a bottom of the groove;
  a rectangular cross section of the groove;
  a V-shaped cross section of the groove;
  a trapezoidal cross-section either widening or tapering inwards from an outer surface of the pole; or
  a depth of groove being 1.05 to 2 times larger than a width of groove.

3. The street pole as claimed in claim 1, wherein at least one top end comprises at least the top end of the antenna section.

4. The street pole as claimed in claim 1, configured as a street lighting pole further comprising an antenna mounted around the antenna section, a luminaire section, a mid-pole section and a base section, wherein a sequence of mutually connected adjacent sections from base to top is: the base section, the mid-pole section, the antenna section and the luminaire section.

5. A luminaire comprising the street pole as claimed in claim 4, further comprising electric cabling at least extending through a core opening in the antenna section and electronic equipment in the mid-pole section and/or the base section and configured for driving a light source accommodated or (to be) accommodated in the luminaire section.

6. The street pole as claimed in claim 1, wherein the local clearance is in a range of 2 to 5.5 mm.

7. The street pole as claimed in claim 1, wherein the local clearance is in a range of 3 to 4.5 mm.

8. The street pole as claimed in claim 1, wherein the pole is the grooved pole with the axial grooves and wherein the pole is provided via a hot dipping coating process with a protective coating of Zinc-Iron alloy or Chromium.

9. The street pole as claimed in claim 1, wherein the reduced outer diameter of the pole is an indent in an outer surface of the pole provided at a location of at least one of the bottom end or at the top end of the antenna.

10. A method of manufacturing an antenna pole section, the method comprising:
  providing an antenna pole section with axial antenna cable guiding grooves in an outer surface of the antenna pole section over a full length of the antenna pole section, the grooves having at least one of the following features:
    an axial sub groove at a bottom of the groove;
    a rectangular cross section of the groove;
    a V-shaped cross section of the groove;
    a trapezoidal cross-section either widening or tapering inwards from the outer surface of the antenna pole section;
    a depth of groove being 1.05 to 2 times larger than a width of groove; or
    coating the antenna pole section with a corrosion resistant coating.

11. The method of manufacturing an antenna section, comprising:
  manufacturing the antenna pole section according to claim 10;
  mounting antenna cables in the grooves;
  providing antenna mounting tolerance means; and
  mounting an antenna onto the antenna pole section.

* * * * *